US010375799B2

(12) United States Patent
Carvalho et al.

(10) Patent No.: US 10,375,799 B2
(45) Date of Patent: Aug. 6, 2019

(54) LIGHTING COMMANDING METHOD AND AN ASSYMETRICAL GESTURE DECODING DEVICE TO COMMAND A LIGHTING APPARATUS

(71) Applicants: Ana Catarina da Silva Carvalho, Savannah, GA (US); Antonio Paulo Mendes Breda Dias Coimbra, Coimbra (PT); Edmundo Faria Filipe, Tavarede (PT); Joao Paulo Pereira de Carvalho, Savannah, GA (US); Paulo Milheiro Caldas Paiva Monteiro, Ega (PT); Pedro Daniel Querido Martinho, Montemor-o-Velho (PT); Tiago Filipe de Pinho Carrilho Goncalves, Covilha (PT)

(72) Inventors: Ana Catarina da Silva Carvalho, Savannah, GA (US); Antonio Paulo Mendes Breda Dias Coimbra, Coimbra (PT); Edmundo Faria Filipe, Tavarede (PT); Joao Paulo Pereira de Carvalho, Savannah, GA (US); Paulo Milheiro Caldas Paiva Monteiro, Ega (PT); Pedro Daniel Querido Martinho, Montemor-o-Velho (PT); Tiago Filipe de Pinho Carrilho Goncalves, Covilha (PT)

( * ) Notice: Subject to any disclaimer, the term of this patent is extended or adjusted under 35 U.S.C. 154(b) by 0 days.

(21) Appl. No.: 15/377,789

(22) Filed: Dec. 13, 2016

(65) Prior Publication Data
US 2018/0014379 A1 Jan. 11, 2018

Related U.S. Application Data

(60) Provisional application No. 62/360,287, filed on Jul. 8, 2016.

(51) Int. Cl.
| H05B 37/02 | (2006.01) |
| G06F 3/01 | (2006.01) |
| G06F 3/03 | (2006.01) |

(52) U.S. Cl.
CPC ......... *H05B 37/0227* (2013.01); *G06F 3/017* (2013.01); *G06F 3/0304* (2013.01)

(58) Field of Classification Search
CPC .............. H05B 37/0227; H05B 37/0272; H05B 37/02; H05B 37/0245; H05B 33/0869;
(Continued)

(56) References Cited

U.S. PATENT DOCUMENTS

| 9,739,498 B2 * | 8/2017 | Katz ........................ F24F 11/30 |
| 2013/0120238 A1 * | 5/2013 | Spaulding .......... H05B 37/0227 345/156 |

(Continued)

*Primary Examiner* — Jimmy T Vu (57) ABSTRACT

A gesture lighting source output command method for controlling a lighting apparatus, together with an asymmetrical, no facing, gesture decoding device for commanding a lighting source, by decoding gesture translational motions of a heat emitting object, e.g. a human hand, at distances up to 1.5 meters, in geometrical planes that may be not coplanar with the gesture decoding device plane, and comprising a casing with an embedded electronic controller and two dual PIR sensors, geometrically arranged in a special manner, rotated $2\alpha$ degrees one relatively to the other, fitted with specially designed Fresnel lenses, their beam axis forming an angle of $2\gamma$ degrees between each other and an angle $\beta$ with the vertical.

6 Claims, 7 Drawing Sheets

(58) Field of Classification Search
CPC .......................... H05B 33/0872; H05B 33/08;
H05B 33/0842; Y02B 20/44; G09G
3/3406; G06F 3/017; G06F 3/03
USPC ................................. 362/276, 227; 361/179
See application file for complete search history.

(56) References Cited

U.S. PATENT DOCUMENTS

| | | | |
|---|---|---|---|
| 2015/0108904 A1* | 4/2015 | Chen ................... | H03K 17/133 315/153 |
| 2017/0254703 A1* | 9/2017 | Purohit ................ | G01J 5/0025 |

* cited by examiner

LIGHTING COMMANDING METHOD AND AN ASSYMETRICAL GESTURE DECODING DEVICE TO COMMAND A LIGHTING APPARATUS

TECHNICAL FIELD

This invention relates to commanding a lighting apparatus through a gesture lighting source command method, and an asymmetrical gesture decoding device.

BACKGROUND

Night lamps and table lamps are important apparatus of the human life at home. Turn-on/off switches are important electrical components of night lamps and table lamps, namely because they are the user interface or the human-machine interface (HMI) of those apparatus. In each home there are many night lamps and table lamps, normally more than the number of people living in those homes. The most popular night lamps and table lamps are mainly turned-on/off by three types of switches, by having into consideration the position on the lamp where they are mounted: (i) attached to the bulb's base (e.g. pushbutton switches and rotating/twist switches), (ii) attached to the base support of the lamp (e.g. pushbutton switches and pole switches), or (iii) attached to the power cord of the lamp (e.g. slider switches, rotary switches, and pole switches).

About the functionality of adjusting the luminosity of the bulb's lamps, with the passive rotating or twist switches it is possible to select two levels of luminosity by selecting one or the two filaments of a 3-way bulb, and with active slider or twist dimmer switches it is possible to continuously dimming the luminosity from zero percent to the full luminosity of the bulb.

Turn-on/off switches may perform the functionality of turning-on, turning-off, or the adjusting of the luminosity of the bulbs of the night lamps and table lamps. However, a user still needs to find, access, and handle the turn-on/off switches of the lamps before he/she can use the device. This operation is still a hard task, mainly, either due to those switches are not easily accessible to the user's hands, or are not simple and easy to be accessed and operated. Sometimes, the device is out of the range of the user's hands, and/or the power cord device is lost behind or beyond the nightstand or table, and/or the device is hard to handle.

In more advanced models of lamps are used touch sensor command features, where with the sequentially touching of a hand in the metallic body of the lamps, the bulb's luminosity changes between low-medium-high-off levels. Also, there are lamps with the functionality of human motion detection based on a PIR (Passive Infrared) sensor, which automatically turn-on when a human motion is sensed and automatically turn-off after a pre-determined period of time. Furthermore, those lamps can have the functionality of daylight detection, by which the light can be turned-on with pre-determined level of darkness or vice-versa. There are also some lamps with the functionality of turning-on/off under human hand motion detection based on a single PIR sensor, using short range detection (lower than 4-inch, 10 cm), which toggles between turn-on and turn-off by the simple motion of the hand. Such arrangements are relatively inaccurate and/or not simple neither easy to operate. Using the detection of a human body or the darkness level to turn-on or turn-off the bulbs of night lamps is inaccurate, therefore not adequate to use in a night lamp apparatus, namely because, either some human body motion in the field of detection of the PIR sensor, or some level of darkness, immediately can turn-on or turn-off the bulb's light, which can be very inconvenient (e.g. if the user is moving on the bed during the night turning on the light by accident or want to place or remove any object over the nightstand or table turning off the lamp inadvertently). Furthermore, the turn-off timer, the no-human body motion detection, or the dawning detection, are also impracticable for such lamps.

It is so desirable to introduce user-friendliness in night lamps and table lamps, through the introduction of new functions/functionalities able to humanize their human-machine interfaces (HMI), whilst still providing simple and easy operation of the apparatus. That's why night lamps and table lamps being commanded remotely without turn-on/off switches have been used.

The introduction of user-friendliness in night lamps and table lamps, through the introduction of new functions and/or functionalities allows to humanize their human-machine interfaces (HMI), whilst still providing simple and easy operation of the apparatus. Currently there are available several technologies to perform the HMI. Therefore, night lamps and table lamps can be commanded remotely without turn-on/off switches by several ways.

Nowadays the HMI tend to be more user friendliness by using natural human-like modes of communication, e.g. through the voice and body gestures decoding, or both, where any verbal communication is usually complemented by non-verbal elements, including hand/body gesturing. Therefore, the HMI that interpret hand gestures as a mode of machine/device input can provide a natural means of interaction with the user.

The HMI contactless command of the electronic appliances is becoming increasingly usual, namely due to the better affinity between the end user and the machine. Also, the contactless gesturing input can reduce keyboard/device surface contamination, which can be an advantage in dirty or clean environments, in the navigation through on-screen contents and/or menus. In several appliances the hands gesturing and voice recognition are already used to provide the base modes of interaction opposing to the HMI based in hardware keyboards or the now popularized capacitive touch screens.

The current commercial gesturing-based HMI are realized, either by processing video streams from a front-facing camera, and/or by specialized emission/reception optoelectronic devices, or by the use of a plane of electric field electrodes to be disturbed by the motion gestures and those perturbations are after computed to command the device. Unfortunately, the video-based systems by specialized optoelectronic devices and video-cams require reasonable energy for capturing the gestures, and in some cases, the illumination of the video scenarios. Most of these systems are either complex having high computer processing requirements, leading to be very expensive, or have limited short distance (several inches/centimeters—max. 4"/10 cm) range of operation between the input device and the gestures to be captured, in a plane parallel to the plane of the device (the gestures should be done facing the decoding device).

Furthermore, most of these systems don't have low power consumption preventing their use in devices where the low power consumption is a mandatory requirement, e.g. in IoT (Internet of Things) remote devices, which may normally be powered by small batteries (e.g. coin batteries).

In simple human detection systems for use in intrusion or automation systems (alarms, lighting turn-on or turn-off, etc.) there are some motion and proximity switches, based in Passive Infrared sensors, or the well popularized PIR sensors, which can only provide limited on/off functionalities.

PIR sensors are used to sense thermal energy emitted by the human body, detecting emitted, rather than reflected energy. The sensing range distance of the PIR sensors can be from a few millimeters to tens of meters, with the adequate Fresnel lens coupled. Thus, in these night lamps and table lamps the devices based on PIR sensors in the current state of the art practice/technologies are not well suited to decode with the necessary accuracy the user's gesturing movements, and therefore are only well suited to detect the presence/absence of human infrared (IR) radiation, in big landscape scenarios (e.g. intrusion alarms or similar).

With the current state of the art devices and technologies, there are in the market PIR devices based on arrays of 2×2 sensing elements (or bigger arrays) arranged over the same plane (e.g. encapsulated in the same case). When these devices are exposed to situations of asymmetrical planes of gesture decoding, and the user's hand is not facing the decoding device of gesture decoding, or there is a long range of decoding, only trapezoidal areas can be presented to the gesturing decoding plane, and it may be hard or almost impossible to decode the true or false gesturing without complex processing capacity, especially if the gesturing is done far from the decoding devices.

In general, the disadvantages of almost all the available HMI systems are that they may be inaccurate in commanding the lighting apparatus, and that may include the inability to select and command multiple lighting apparatus, in a simple and easy way, and/or may be complex and expensive due to the use of video-based technologies, with high computer processing requirements (video-cams, computer vision and digital image processing), and/or may have considerable power consumption, and therefore cannot be powered by small batteries neither being able to be used in night lamps and table lamps.

SUMMARY OF THE INVENTION

The present invention is mainly focused in to obviate the disadvantages of the prior art and in the assuring of immediate and easy operation of the lighting apparatuses, night lamps and table lamps.

It is a further object of the invention to provide a gesture lighting source command method, based in an asymmetrical gesture decoding device, and a lighting apparatus that uses the method.

The user gestures are decoded in three-dimensional space of the gesture decoding environment inside a main target area (MTA) and with determined user gestures may be commanded specific parameters of the lighting source output, as its intensity and color. Therefore, different gesture forms can be decoded and assigned to command the different parameters of the lighting source. The gestures can be decoded in geometrical planes not coplanar with the asymmetrical gesture decoding device plane (plane where the device is geometrically positioned), in three-dimensional space of the gesture decoding environment, defined by the pyramid of a base equal to the MTA and by the vertex of the geometric position of the asymmetrical gesture decoding device. In practice, the movements can be decoded even when the user's hand is not facing the decoding device, in a multitude of user's hand motion planes.

The lighting source may be, either a special bulb's base (E26, E27, or other base type), or special lighting bulbs (E26, E27, or other base type), with an embedded electronic controller, designed to control and/or to command all the functions, functionalities, or parameters of the related lighting sources, to perform the signal data communications with the asymmetrical gesture decoding device, by a cabling harness or wireless, and to perform signal commands, which should change at least one parameter of the related lighting source output.

In accordance with an embodiment, there is provided a lighting source output command method for commanding a lighting apparatus by the motion of a heat emitting object inside the three-dimensional space of the gesture decoding environment. The lighting apparatus includes at least an asymmetrical gesture decoding (AGD) device and a lighting source.

The asymmetrical gesture decoding (AGD) device comprises two dual PIR sensors, arranged in a special manner, rotated $2\alpha$ degrees one relatively to the other (one $+\alpha$ degrees relatively to the horizontal, the other $-\alpha$ degrees), fitted with specially designed Fresnel lenses, and forming an angle of $2\gamma$ degrees between their beam axis and an angle $\beta$ with the vertical. By reading the two dual PIR sensors information is obtained a two-dimensional data sequence for the heat emitting object motion inside the MTA, allowing the decoding of that motion by a software implemented algorithm. After that it is determined whether the motion of the heat emitting object complies with a predetermined condition in the memory of the embedded electronic controller, issuing a control signal if the motion does comply with a predetermined condition in memory, and commanding the lighting source by changing at least one parameter of the lighting source output. The command control signal can be sent via a cabling harness or wireless.

Each dual PIR sensor is fitted with a Fresnel lens constituting a dual PIR sensor set. Each dual PIR sensor and its Fresnel lens define a three-dimensional space of the gesture environment that is approximately an irregular quadrangular pyramid with its vertex at the PIR sensor and lateral faces defined by the Fresnel lens opening angles. The base of this pyramid is defined by the environment boundaries such as the top surface of the table where the lighting apparatus might be located, or the ceiling or the floor. The intersection of the emitting heat object motion plane with this pyramidal volume is named as secondary target area (STA).

The main target area (MTA) is the intersection of the two secondary target areas, STA-A and STA-B, each corresponding to the IR motion detection area of each dual PIR sensor with its Fresnel lens.

In accordance with another embodiment, there is provided a lighting source output command method for commanding a lighting apparatus by the motion of a first heat emitting object interacting with a second heat emitting object inside the three-dimensional space of the gesture decoding environment, by considering the MTA, STA-A, and STA-B. While the two heat emitting objects are one in each STA, the motion of each object is readable by its dual PIR sensor set.

If the two heat emitting objects are simultaneously in both STA, the response of the two dual PIR sensor sets is more complicated and more difficult to interpret.

The lighting apparatus includes at least an asymmetrical gesture decoding device and a lighting source.

The lighting source output command method includes the steps of collecting the IR light emitted by two heat emitting objects, by the two PIR sensors set arranged in a special manner, obtaining the two-dimensional data sequence for both heat emitting objects motion inside the MTA and STAs, decoding the motion of the first heat emitting object by utilizing the two-dimensional data sequence, decoding the motion of the second heat emitting object by utilizing the two-dimensional data sequence, determining whether the motion of the first heat emitting object complies with a first predetermined condition in the memory, determining whether the motion of the second heat emitting object complies with a second predetermined condition in the memory, issuing a command signal if the motion does comply with the first predetermined condition in memory and the second object motion does comply with the second predetermined condition in memory, outputting the command signal via a cabling harness or wireless, receiving the command signal in the lighting source, and commanding the light source output by changing at least one parameter of the lighting source output.

In accordance with a final embodiment, there is provided a lighting apparatus that acts as a remote command, of other remote lighting apparatus that may be remotely commanded at least inside the same room, by a motion of a heat emitting object inside the three-dimensional space of the gesture decoding environment.

The lighting apparatus includes at least a lighting source, an asymmetrical gesture decoding device, and may be set to be remotely commanded using a wireless communication protocol, e.g. over an Internet of Things (IoT) concept. The second lighting apparatus may be remotely commanded under a wireless communication protocol, e.g. over an IoT concept, and should include at least one lighting source.

The gestures are decoded in the three-dimensional space of the gesture decoding environment, defined by the pyramid of base equal to the MTA and by the vertex of the geometric position of the asymmetrical gesture decoding device. The user does not need to face toward the asymmetrical gesture decoding device in order to successfully command the lighting apparatus as the gestures are decoded in geometrical planes that may not be coplanar with the asymmetrical gesture decoding device plane (plane where the device is geometrically positioned) Therefore, the gestures can be decoded even when the user is facing in a 90 degrees direction from the direction of the asymmetrical gesture decoding device since the gestures are recognized in the three-dimensional space of the gesture decoding environment, inside the MTA or inside one or both of the two STA. The invention allows the user to command a lighting apparatus intuitively by doing gestures inside the three-dimensional sensitive space of the asymmetrical gesture decoding (AGD) device environment, even when the lighting apparatus is separated from the AGD by a large distance or a wide angle.

DETAILED DESCRIPTION

For a better understanding of the present invention, together with other and further objects, advantages and capabilities thereof, reference is made to the following disclosure and appended claims taken in conjunction with the above-described drawings.

Figure 1:
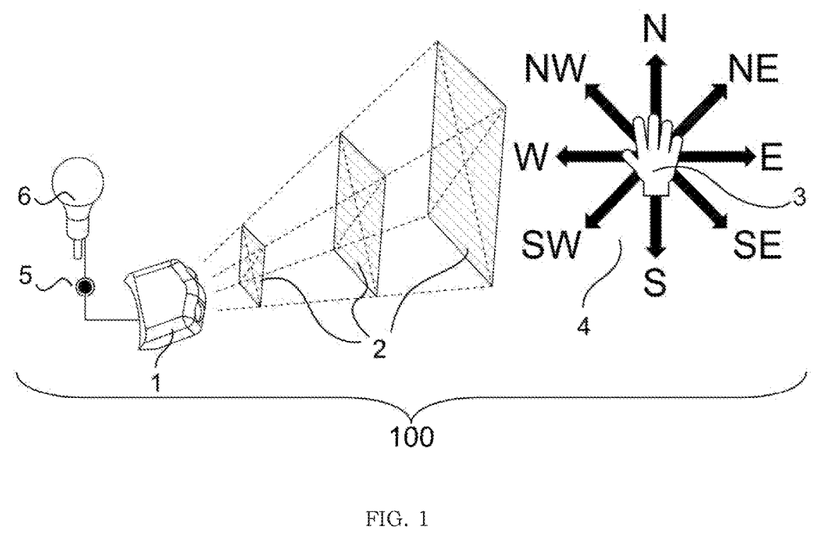
FIG. 1 shows a representation of a lighting apparatus being commanded by a user hand motion through an embodiment of the invention.

With reference to FIG. 1, it is represented the three main components of a lighting apparatus and command method 100, in accordance with one embodiment of the invention. The three main components are (from left to right):

a lighting source 6 an AGD 1 with its MTA 2 and communication system 5 a user hand 3 which is the heat emitting object that commands the lighting source by making gestures according to some previously defined directions 4 in one of the MTA 2.

So, the lighting apparatus and command method 100 includes an asymmetrical gesture decoding device 1, a cabling harness or wireless communication 5, and a lighting source 6, which emits an output light and may include, but is not limited to, a E26 light bulb for emitting the output light.

Figure 2:
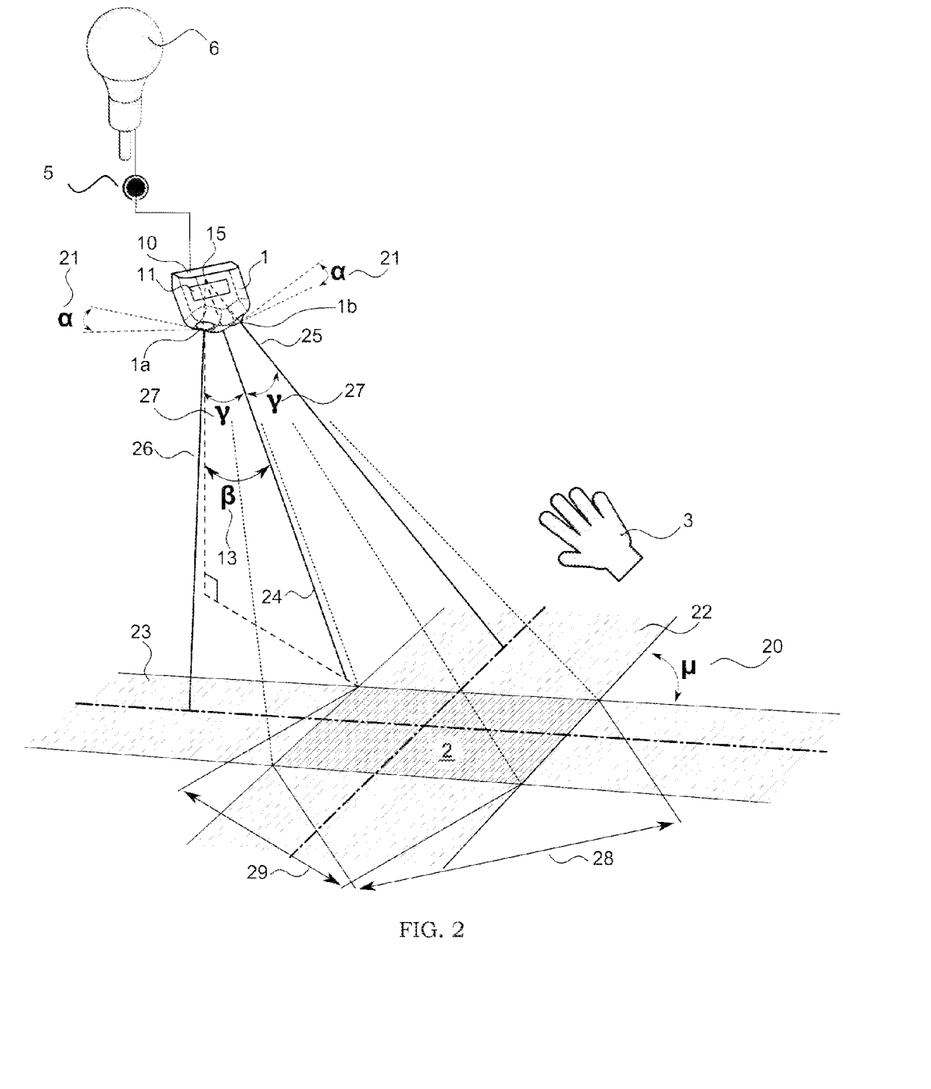
FIG. 2 is a more detailed schematic illustration of a lighting apparatus being commanded by a user hand motion according to an embodiment of the invention.

With reference to FIG. 2, it is shown the asymmetrical gesture decoding device 1 comprising a set of two dual PIR sensors, 1a and 1b, commercially available, arranged in a special manner, rotated one relatively to the other by 2α degrees (each rotated +/−α degrees, 21, relatively to the horizontal), forming an angle of 2γ degrees 27 (γ+γ degrees) between their beam axis and an angle β 13 with the vertical; an embedded electronic controller 11; a cabling harness or wireless communication, presented at output 5, and a case 10.

Figure 8:
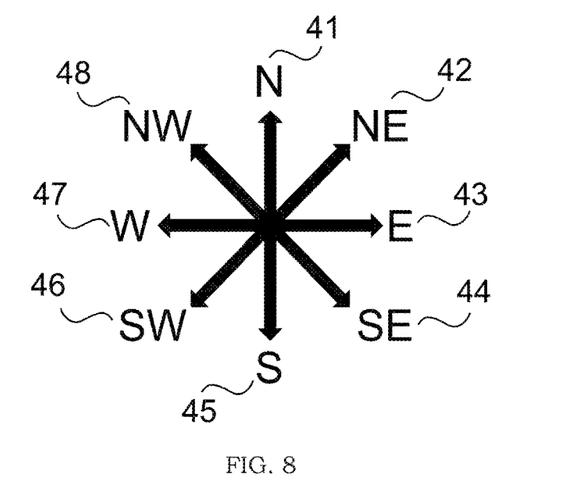
FIG. 8 is the illustration of one example of the possible command directions of detected motions of the heat emitting object.

Still with reference to FIG. 2, the lighting source 6 is commanded by the motion of a user's hand 3, by performing one of the different accepted motions (41 to 48, shown as example in FIG. 8), or a sequential combination of the different accepted motions, as a two-dimensional data sequence, within the entire three-dimensional space of the gesture decoding environment that is defined by the pyramid of base equal to the motion target area (MTA) 2 and vertex 15 defined by the two PIR axes 25 and 26 of PIR-A 1a and PIR-B 1b, on the asymmetrical gesture decoding (AGD) device 1. The asymmetrical gesture decoding device 1 outputs a motion of a user's hand related command signal via a cabling harness or wireless communication 5, to be received by the lighting source 6 that should command the light source output by changing at least one parameter of the lighting source output. In this figure example the light source is constituted by a light bulb and a light socket.

For instance, the lighting apparatus and command method 100 may be commanded by a user's hand 3 gestures moving over a nightstand top in a bedroom environment.

The IR light emitted by the heat emitting object 3 moving within the three-dimensional gesture decoding environment, is collected by the two dual PIR sensor sets, 1a and 1b, through continuous scans, as a two-dimensional data sequence, with usual output patterns of positive or negative voltages, depending on the direction of the movement of the moving heat emitting object, and voltage amplitudes depending on the intensity of the IR light received from the heat emitting object as can be seen in the commercial PIR devices data-sheets available commercially. When a heat emitting object is inside the secondary target area A (STA-A) 22 (this area being defined by the Fresnel lens of PIR-A 1a) its IR radiation is detected by PIR-A 1a and when is inside the secondary target area B (STA-B) 23 (this area being defined by the Fresnel lens of PIR-B 1b) its IR light is detected by PIR-B 1b.

The embedded electronic controller 11 performs all the tasks of powering the electronic circuitry of the asymmetrical gesture decoding device 1, collecting the IR light information voltages captured by PIR-A 1a and PIR-B 1b, processing all the analog and/or digital data, obtaining the two-dimensional data sequence for the heat emitting object 3 motion, decoding the motion of the heat emitting object by utilizing the two-dimensional data sequence, determining whether the motion of the heat emitting object complies with a predetermined condition in the memory, issuing a command signal if the motion does comply with the predetermined condition in memory, outputting the command signal via a cabling harness or wireless communication 5, through a state of the art communication protocol. The embedded electronic controller 11 is present in all the embodiments of the asymmetrical gesture decoding device 1.

After the IR light emitted by the heat emitting object is collected by the two dual PIR sensors, 1a and 1b, their voltage output values are processed by the embedded electronic controller 11 in order to evaluate if the heat emitting object 3 gestures were performed inside the main target area (MTA) 2. This is an operation of mathematically overlapping the valid voltage output values of PIR-A 1a and PIR-B 1b to evaluate if the heat emitting object 3 gestures were performed inside the MTA 2 which consists in the intersection between STA-A 22 and STA-B 23. Therefore, if the heat emitting object 3 gestures were performed inside the MTA 2 it is obtained a two-dimensional data sequence for the heat emitting object 3 motion inside the MTA 2.

This way, all the heat emitting object 3 gestures performed inside the entire three-dimensional space of the gesture decoding environment, defined by the pyramid of base equal to the MTA 2 and by vertex 15 defined by the two IR beam axes 25 and 26 of PIR-A 1a and PIR-B 1b, of the asymmetrical gesture decoding device 1, should have a related two-dimensional data sequence and should be considered valid to decode the pattern of motion of a heat emitting object 3 by utilizing the related two-dimensional data sequence. By using the obtained two-dimensional data sequence, it is decoded the pattern of motion of the heat emitting object 3, by having in consideration the set of the previously defined possible moving patterns.

If the motion of the heat emitting object 3 complies with a predetermined condition in the memory of the embedded electronic controller 11, then it is outputted to the lighting apparatus light source 6 a command signal via a cabling harness or wireless 5. This command signal is meant to change or set at least one parameter of the related lighting source 6 output.

Figure 3:
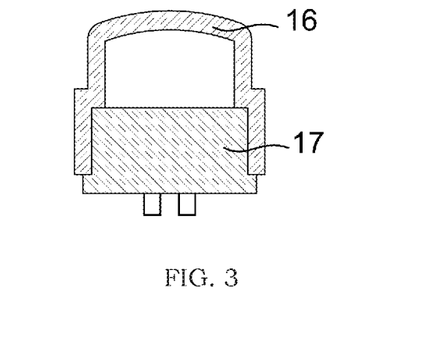
FIG. 3 shows a representation of a commercially available dual PIR sensor set, consisting of a case with two IR sensing elements fitted with a Fresnel lens.

FIG. 3 shows a cross section representation of a commercially available dual PIR sensor set, consisting of a case 17 with two IR sensing elements, fitted with a specially designed Fresnel lens 16.

Still with reference to FIG. 2, a commercially available dual PIR sensor set, named PIR-A 1a, having the sensing elements aligned with a motion axis "x", aligned with the STA-A 22, enables the decoding of the motion of an IR source, by analyzing the polarity of the sensor output voltage curves depending on the relative motion direction of the IR source as can be seen in the manual of the PIR sensor manufacturer. Therefore, by capturing alternating voltage polarity of the sensing elements in the PIR-A sensor 1a, a clear decoding of the motion along the direction of the axis "x" is obtained.

If it is used a second dual PIR sensor set, named PIR-B 1b, having the sensing elements aligned with a motion axis "y", aligned with the STA-B 23, not aligned and crossing the motion axis "x" by an angle "μ" 20, enables the decoding of the motion of an IR source 3, by analyzing the polarity of the sensor output voltage curves depending on the relative motion direction of the IR source 3. Therefore, by capturing alternating voltage polarity of the sensing elements in the PIR-B sensor 1b, a clear decoding of the motion along the direction of the axis "y" is obtained.

Angles α 21, γ 27, β 13 and μ 20 are all related by 3D geometry.

Moreover, if the motion of IR source 3 is the same in both axes, and a motion in both dual PIR sensor sets, PIR-A 1a and PIR-B 1b, is decoded, then a combined translational motion "x-y" of the IR source 3 (e.g. a human hand) is decoded.

To go through the goal of the gestures decoding, the arrangement of both dual PIR sensor sets can be considered a specially arranged 2×2 array of sensing elements. Therefore, a 2×2 array of sensing elements, obtained from the special geometrical arrangement of PIR-A sensor set 1a and PIR-B sensor set 1b, can detect the changing of the infrared radiation generated by a translational motion of a heat emitting body over that array.

With a special angular arrangement of the angle β 13, angle α 21 and angle γ 27, is possible to establish a main target area (MTA) 2, that will be the center of the gesture decoding "machine" hereby presented, consisting of a parallelogram with a smaller diagonal dimension of "l" 29 and a larger diagonal dimension of "L" 28, where "l" depends on the width of the vertical detection area of the adopted Fresnel lens (with adequate focal length, detectable distance, and viewing angle, designed in accordance with a real application decoding needs and with current state of the art of designing this kind of lens).

Possible (but not restricted to) values for the referred angle variables are:

α—22.5 degrees
β—40 degrees
γ—22.5 degrees

Figure 7:
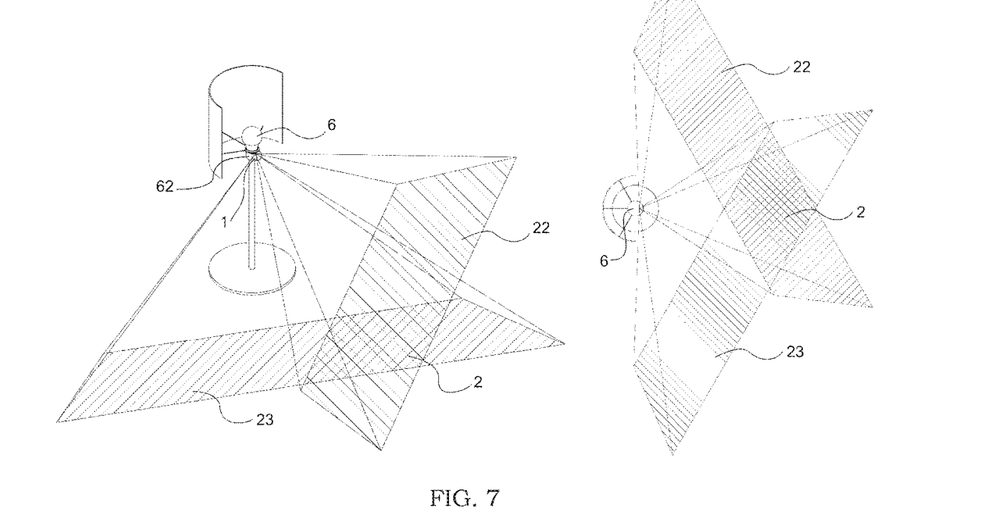
FIG. 7 shows one example of the realization of a lighting apparatus according to this invention, showing the three-dimensional space of the gesture decoding environment (perspective view and top view). It is also represented the secondary target area (STA) of each dual PIR sensor set.

FIG. 7 shows the STAs (STA-A 23 and STA-B 22) and MTA 2 obtained with these angles, being the AGD 1 located at a height of 0.5 meter over a large table (perspective view and top views). It is shown a lighting apparatus comprising a light source 6, its socket 62 and an AGD device 1.

By changing the three angle values, are obtained different STAs and MTAs, and consequently different three-dimensional space volumes of the gesture decoding device environment.

Ideally, the size of the horizontal detection area (or MTA 2) defined by the Fresnel lens should be specified in order to avoid the presence of lateral noise in the named "Secondary Target Area A (STA-A)" 23, detected from PIR A, and in the "Secondary Target Area B (STA-B)" 22, detected from PIR B. Therefore, the MTA 2 can be specified for a specific application, having in consideration the specific requirements of such application.

This important math geometric characteristic enables the process of decoding gestures to be maintained only dependent of the extension of the heat emitting object motion inside the MTA 2, becoming the gesturing decoding completely restricted to the MTA, obtaining this way gesturing output results almost free of faking command gestures. So, the geometric characteristics of this invention make that hand gestures outside the MTA, because outside one of the STAs, is easily excluded, resulting in an operation almost free of faking gestures that are not intentional to operate the lighting device.

Having one heat emitting object inside the STA-A 23 and another inside the STA-B 22, both close to but out of the MTA, allows to decode two heat emitting objects' motion gestures.

In practice, with a same gesture motion of the heat emitting object, being it either at a closer or farther plane away from the gesturing decoding device, a similar gesture decoding output should be obtained inside the MTA. This is an important output result to ensure reproducible gesture decoding results for similar gesture motions performed at different planes, at different heights, as seen in FIG. 1.

The computation of the translational gesturing decoding outputs can be obtained by math and algorithmic operations determined by the operation of the current reading output values from PIR-A sensor set 1a and PIR-B sensor set 1b.

Besides, motions NW-SE or SE-NW and SW-NE or NE-SW (see FIG. 8), can be decoded by direct reading of the output values from the dual PIR-A 1a and PIR-B 1b sensor sets, when the gestures motion is almost completely performed either over the STA-A 23, or over the STA-B 22.

Figure 4:
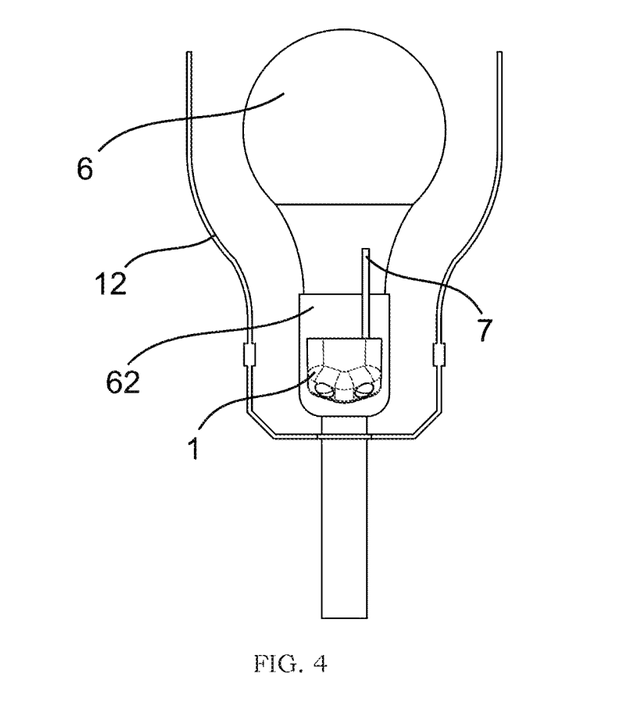
FIGS. 4, 5 and 6 illustrate examples of realizations of the embodiment of the invention, with the asymmetrical gesture decoding device connected either: via a cabling harness to the lighting source (FIG. 4), via a cabling harness to a light bulb's base (FIG. 5), or via wireless communication to a light bulb (FIG. 6).
Figure 5:
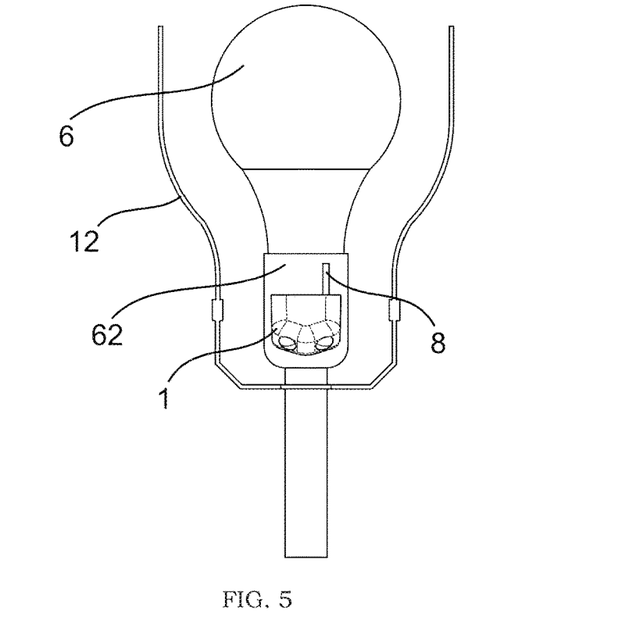
Figure 6:
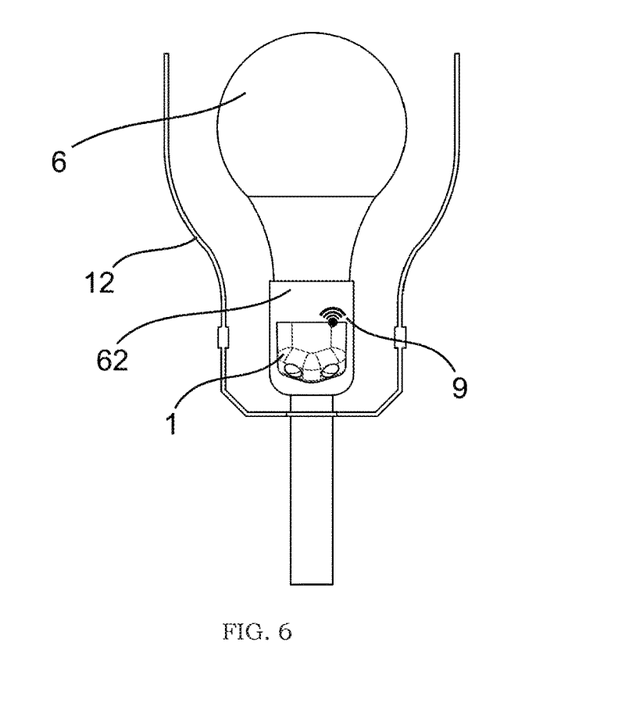

With reference to FIGS. 4, 5 and 6, are presented three different examples that represent part of a lamp with a lampshade (abat-jour) holder 12. It is depicted a lighting source 6 comprising, either a special lighting bulb (E26, E27, or other base type), or a special bulb's base (E26, E27, or other base type), with an embedded electronic controller, designed to control and/or command all the functions, functionalities, or parameters of the related lighting source, to perform the signal data communications with the asymmetrical gesture decoding device 1, by a cabling harness or wireless communication, and to perform signal commands which should change at least one parameter of the related lighting source output. In other words, the referred electronic controller can be embedded in light bulbs or in bulb sockets.

With reference to FIG. 4, a special light bulb (E26, E27, or other base type) 6 may comprise an embedded electronic controller designed mainly to communicate data, through receiving and emitting data by a cabling harness 7, such that by emitting a "ready" command, is able for receiving a command signal from the output of the asymmetrical gesture decoding device 1, and may change at least one parameter of the related lighting source 6 output. Other functionalities of this special light bulb may include, but is not limited to, the low voltage powering of the asymmetrical gesture decoding device 1, using the same cabling harness designed to communicate data, and a secondary wireless communication protocol in order to integrate the lighting apparatus into an IoT system.

With reference to FIG. 5, a special bulb's base (E26 socket, E27 socket, or other base type socket) 62 may comprise an embedded electronic controller designed mainly to communicate data, through receiving and emitting data by a cabling harness 8, such that by emitting a "ready" command, is able for receiving a command signal from the output of the asymmetrical gesture decoding device 1, and may change at least one parameter of the related lighting source 6 output. In this example, the lighting source device 6 may be a light bulb (E26, E27, or other base type bulb) that should have characteristics to able the change of at least one parameter of the related light output. Other functionalities of the special bulb's base (E26 socket, E27 socket, or other base type socket) may include, but is not limited to, the low voltage powering of the asymmetrical gesture decoding device 1, using the same cabling harness designed to communicate data, and a secondary wireless communication protocol, in order to integrate the lighting apparatus into an IoT system.

With reference to FIG. 6, a special light bulb (E26, E27, or other base type) 6 may comprise an embedded electronic controller designed mainly to communicate data, through receiving and emitting data by wireless communication 9, such that by emitting a "ready" command, is able for receiving a command signal from the output of an asymmetrical gesture decoding device 1, and may change at least one parameter of the related lighting source 6 output. Other functionalities of this special light bulb may include, but is not limited to, a secondary wireless communication protocol, in order to integrate the lighting apparatus into an IoT system commanded by only one asymmetrical gesture decoding device 1.

Figure 9:
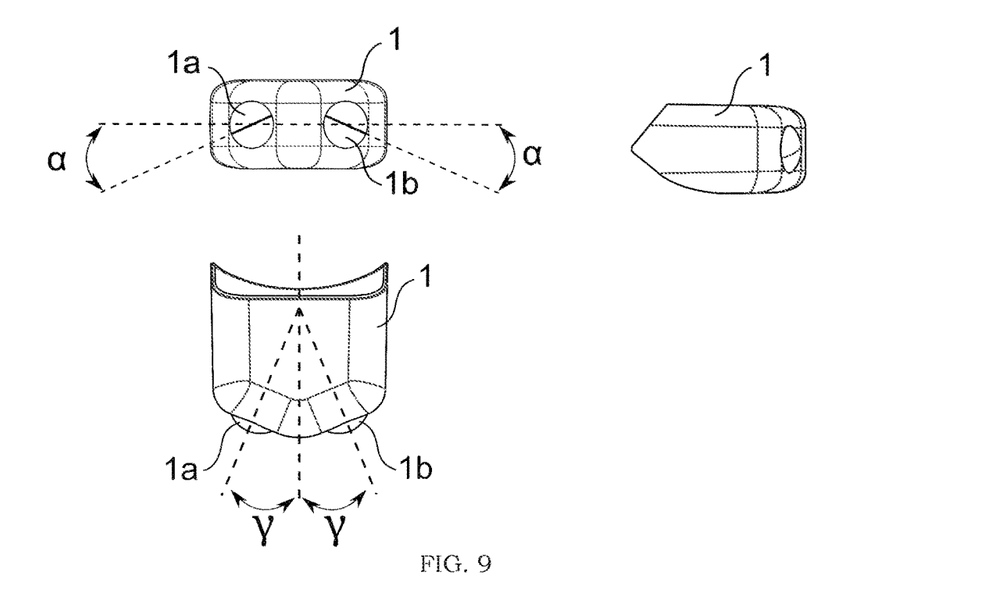
FIG. 9 shows one example of a realization of the asymmetrical gesture decoding (AGD) device (front view, side view, top view).

With reference to FIG. 9, it is shown three views of one example of realization of an asymmetrical gesture decoding device 1, comprising a set of two dual PIR sensors, 1a and 1b, commercially available, arranged in a special manner, rotated one relatively to the other by $2\alpha$ degrees (each rotated $+/-\alpha$ degrees, relatively to the horizontal), forming an angle of $2\gamma$ degrees ($\gamma+\gamma$ degrees) between their beam axis.

Figure 10:
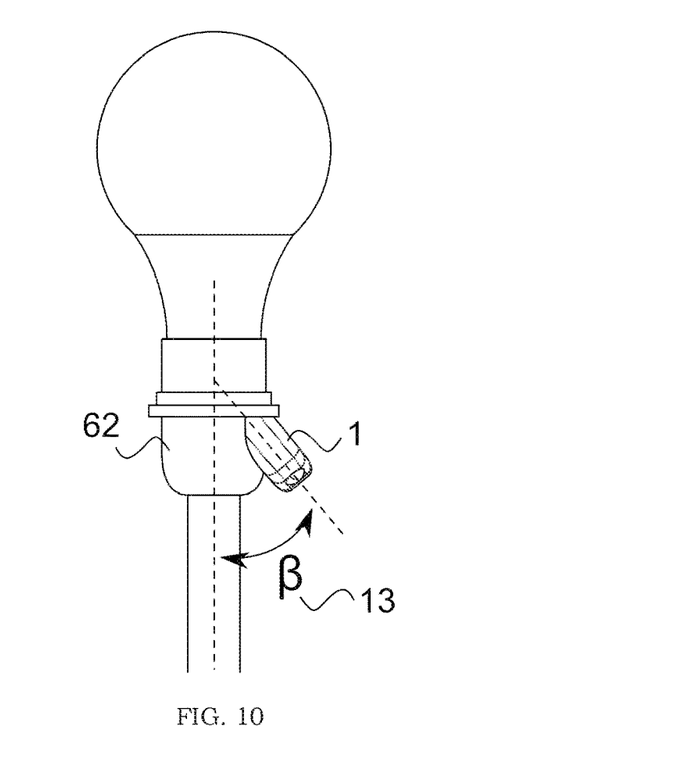
FIG. 10 shows one example of realization of the invention and placement of the AGD device in a lighting apparatus.

FIG. 10 illustrates one example of realization of the invention and placement of the AGD device 1 in a lighting apparatus. In this example, the AGD 1 is positioned so that the three-dimensional space of the gesture environment is defined below the AGD location and the plane of the motion of the object emitting heat is below the AGD. The AGD 1 might be located away from the lighting source, secured on another support, for instance on its socket 62, with the proper harness or wireless connection. In some embodiments of the invention, angle 1 can be fine tuned using a physical layout with several fixing positions or using a continuously varying fixing mechanism. This way it is possible to vary the three-dimensional space of the gesture environment and the main target area (MTA) 2. In other embodiments, like in FIG. 10, angle $\beta$ 13 is constant and defined by the casing of the AGD device 1.

Figure 11:
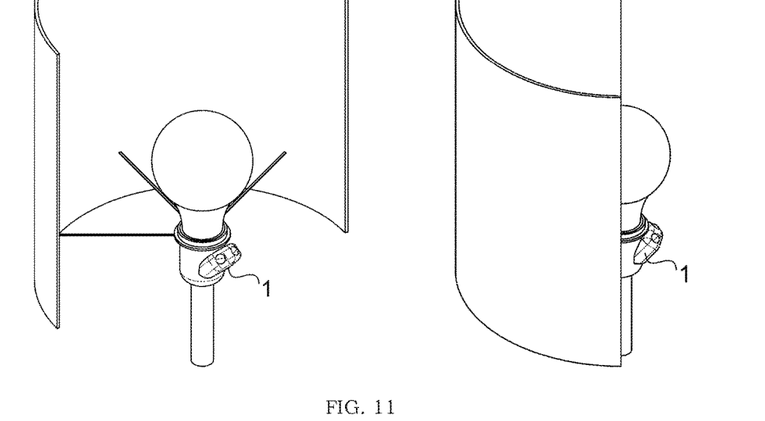
FIG. 11 shows two perspective views of another example of realization of the invention and placement of the AGD device in a lighting apparatus.

FIG. 11 shows two perspective views of another example of realization of the invention and placement of the AGD device 1 in a lighting apparatus. In this example of embodiment, the AGD 1 is positioned so that the three-dimensional space of the gesture environment is defined above the AGD location and the plane of the motion of the heat emitting object is above the AGD. The AGD might be located away from the lighting source, secured on another support, with the proper harness or wireless connection.

Figure 12:
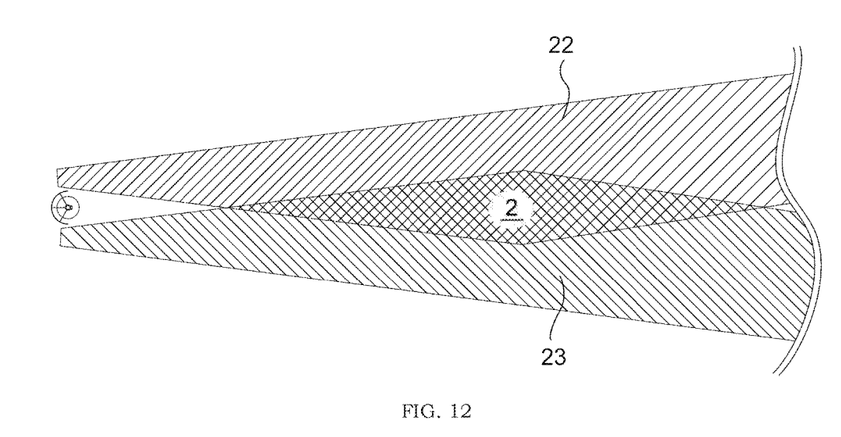
FIG. 12 shows the STA and MTA areas (top view, truncated at right) when the angle α equals 77.5 degrees and the AGD is at the height of 0.5 meter over the top of a table.

FIG. 12 shows the STAs (STA-A 23 and STA-B 22) and MTA 2 areas (top view, truncated at right) obtained when angle α equals 77.5 degrees and the AGD is at the height of 0.5 meter over the top of a table. In this case the two STAs are quite long and might suffer from unwanted motion interference of other heat emitting objects that are not intended to command the lighting apparatus.

So, in FIG. 2 is illustrated a gesture lighting source output command method for controlling a lighting apparatus, together with an asymmetrical gesture decoding device 1 for commanding a lighting source 6, by transmitting a command signal by a sequence of digital pulses by a cabling harness or wireless communication, presented at output 5, coded from the gesture translational motions (for instance 41 to 48 shown as example in FIG. 8) of a heat emitting object 3 (e.g. a human hand) motion gestures, almost without false decoding, by decoding the gesture motions at distances up to about 1.5 meters, inside the three-dimensional space of the gesture environment or inside the main target area (MTA) 2, in geometrical planes not coplanar with the asymmetrical gesture decoding device plane (plane where the device is geometrically positioned and that makes an angle β 13 with the vertical), in three-dimensional space of the gesture decoding environment, defined by the pyramid of base equal to the MTA 2 and by the vertex 15 defined by the two IR beam axes 25 and 26 of PIR-A 1a and PIR-B 1b of the asymmetrical gesture decoding device 1.

The asymmetrical gesture decoding device 1 comprising two dual PIR sensors sets, 1a and 1b, geometrically arranged in a special manner, rotated 2α degrees one relatively to the other (+/−α degrees 21, relatively to the horizontal), fitted with two specially designed Fresnel lens 16 (see FIG. 3) forming an angle of 2γ degrees 27 (γ+γ degrees) between their beam axis and an angle β 13 with the vertical. The asymmetrical gesture decoding device 1 is geometrically fixed in order to form the MTA 2, from where the two-dimensional gesture sequence will be decoded, and also comprises an embedded electronic controller 11, a cabling harness or wireless communication, presented at output 5, and a case 10.

The asymmetrical gesture decoding method comprises the asymmetrical gesture decoding device 1, one IR beam focused to PIR-A 1a, another IR beam focused to PIR-B 1b, a lighting source 6, communicating by a cabling harness 7 or 8, or by wireless 9 (see FIGS. 4, 5 and 6), and commanded by a sequence of digital pulses, from the output 5 and coded from the gesture translational motions (for instance 41 to 48 shown as example in FIG. 8) from an emitting heat object, e.g. a human hand 3 motion gestures, by decoding the human hand gesture motions at distances up to about 1.5 meters, in geometrical planes above the MTA 2, not coplanar with the asymmetrical gesture decoding device plane 13 (plane where the device is geometrically positioned), and the algorithms computing the motion of the heat emitting object, e.g. a human hand 3 motion gestures, by utilizing the two-dimensional data sequence inside the MTA 2, provided by the asymmetrical gesture decoding device 1, to obtain the coded sequence of command pulses in output 5 to change the status of the output light of the lighting source 6, if the motion of the object conforms with a predetermined condition saved in the memory of the embedded electronic controller 11.

Whilst the principles of the invention that have been described herein, it should be understood by who has knowledge in this art that this detailed description is made only as a mode to exemplify and not as a limitation as to the scope of this invention.

Reference numerals corresponding to the embodiments described herein may be provided in the following claims as a way of convenient reference to the examples of the claimed subject matter shown in the available drawings. Should be understood however, that the reference numerals are not intended to limit the scope of the related claims.

Other embodiments can be contemplated within the scope of the present invention in addition to the examples of the embodiments shown and described herein.

Substitutions and/or modifications by one of ordinary skill in the art are considered to be within the scope of the present invention, which is not to be limited except by the declamations of the following claims.

REFERENCES

[1] Patent US20130120238 Light Control Method and Lighting Device Using the Same, from Osram Sylvania Inc., May 16, 2013.
[2] U.S. Pat. No. 5,291,020—Method and Apparatus for Detecting Direction and Speed Using a PIR Sensor, from Intelectron Products Company, Mar. 1, 1994.
[3] Patent US2016/0077600—Switch Operating Device, Mobile Device, and Method for Operating a switch by a Non-Tactile Translational Gesture, from Pyreos Ltd., Mar. 17, 2016.
[4] U.S. Pat. No. 8,830,171—Apparatus for Non-Contact 3D Hand Gesture Recognition with Code-Based Light Sensing, from Eminent Electronic Technology Corporation, Sep. 9, 2014.
[5] U.S. Pat. No. 5,695,091—Automated Dispenser for Disinfectant with Proximity Sensor, from the Path-X Corporation, Dec. 9, 1997.

What is claimed is:

1. A gesture lighting source output command method for commanding a lighting apparatus by a motion of a heat emitting object inside the three-dimensional space of a gesture decoding environment, wherein the improvement comprises the lighting apparatus including a lighting source and an asymmetrical gesture decoding device, the asymmetrical gesture decoding device comprising a casing with an embedded electronic controller and a set of two dual PIR sensors, geometrically arranged in a plane with an angle β with the vertical, dual PIR sensors that are rotated 2α degrees one relatively to the other, and fitted with specially designed ordinary Fresnel lenses, their beam axes forming an angle of 2γ degrees between each other, the above mentioned three angles (β, 2α, 2γ) establishing a main target area (MTA), a three-dimensional space of the gesture decoding environment being defined by a pyramid of base equal to the mentioned main target area (MTA) and vertex defined by the mentioned beam axes of the two mentioned dual PIR sensors, the motion of the heat emitting object being, although not restricted to, in geometrical planes parallel to the ground and inclined relatively to the asymmetrical gesture decoding device plane, and the such lighting source output command method including steps of:

collecting the IR light emitted by a heat emitting object inside the three-dimensional gesture decoding environment, through the two dual PIR sensors set, through continuous scans as two-dimensional data sequence;

evaluating if the heat emitting object gestures were performed inside the mentioned main target area (MTA)

by processing the outputs of the two mentioned dual PIR sensors, in the embedded electronic controller;

obtaining the two-dimensional data sequence for the heat emitting object motion, simultaneously, one data sequence from each dual PIR sensor;

decoding the motion of the heat emitting object by computing the two-dimensional data sequence;

determining whether the motion of the heat emitting object complies with a predetermined condition in the memory;

issuing a command signal if the motion does comply with one predetermined condition in memory;

outputting the command signal to the lighting source, and;

commanding the lighting source by changing at least one parameter of the lighting source output if the motion of the heat emitting object complies with a predetermined condition.

2. The gesture lighting source output command method of claim 1, wherein the heat emitting object is a human hand and the motion of the object is a human gesture by using one of the human hands.

3. The gesture lighting source output command method of claim 1, wherein the commanding motion of a heat emitting object in compliance with a predetermined condition, may represent an only motion, several repetitions of the same motion, or successive different motions of the heat emitting object inside the three-dimensional space of the gesture decoding environment.

4. The gesture lighting source output command method of claim 1, wherein the lighting source output command method includes steps of:

collecting the IR light emitted by two heat emitting objects inside the three-dimensional gesture decoding environment, through the two dual PIR sensor sets, through continuous scans as two-dimensional data sequence;

obtaining the two-dimensional data sequence for both heat emitting objects motion, simultaneously, one data sequence from each dual PIR sensor;

decoding the motion of the heat emitting objects by computing the two-dimensional data sequence;

determining whether the motion of both heat emitting objects complies with a predetermined condition in the memory;

issuing a command signal if the motion of both heat emitting objects does comply with a predetermined condition in memory;

outputting the command signal to the lighting source, and;

commanding the lighting source by changing at least one parameter of the lighting source output if the motion of the heat emitting objects complies with a predetermined condition.

5. The gesture lighting source output command method of claim 1, wherein the asymmetrical gesture decoding device is located on an object different than the lighting source.

6. The gesture lighting source output command method of claim 1, wherein one asymmetrical gesture decoding device commands more than one lighting source.

* * * * *